INVENTOR.
GEORGE K. WEBER

Oct. 1, 1968  G. K. WEBER  3,404,210
MELTING FURNACE
Filed June 23, 1967  2 Sheets-Sheet 2
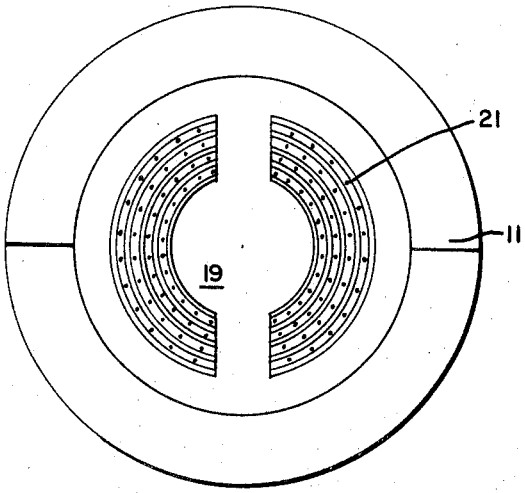
FIG. 2
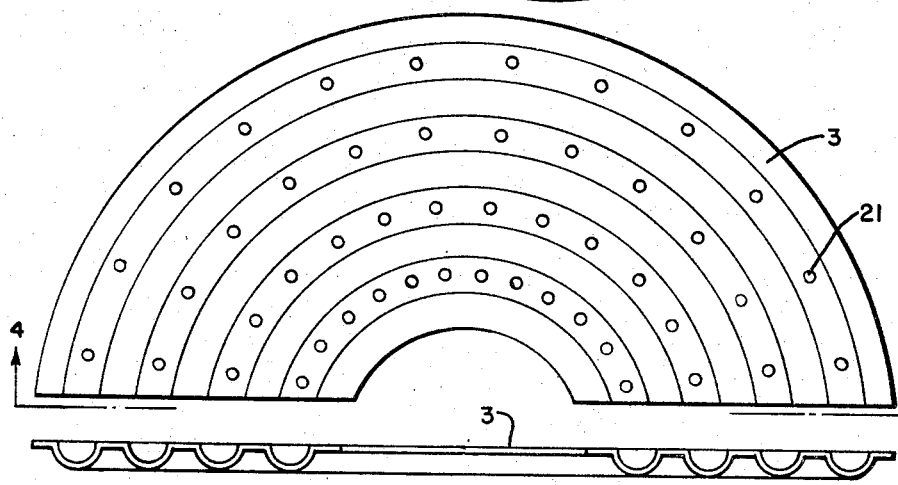
FIG. 3
FIG. 4
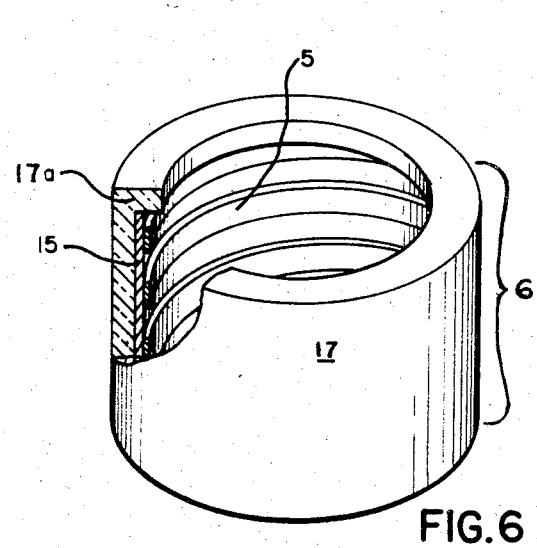
FIG. 6
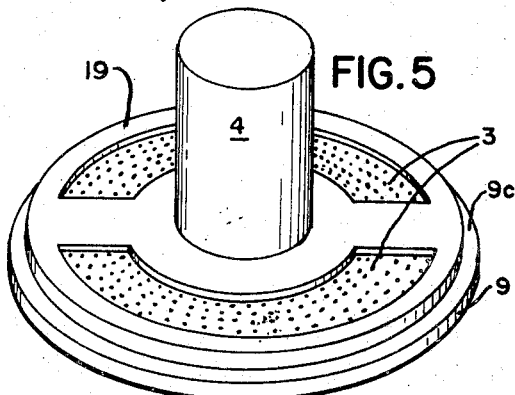
FIG. 5
INVENTOR.
GEORGE K. WEBER
BY *Edward M. Steinman*
ATTORNEY United States Patent Office 3,404,210
Patented Oct. 1, 1968

3,404,210
MELTING FURNACE
George K. Weber, Louisville, Ky., assignor to American Air Filter Company, Inc., Louisville, Ky., a corporation of Delaware
Filed June 23, 1967, Ser. No. 648,437
7 Claims. (Cl. 13—22)

ABSTRACT OF THE DISCLOSURE

A furnace to melt a thermoplastic material including a crucible defining a chamber in which thermoplastic material is melted, the crucible being provided with heating means so selected segments of the outer surface of the crucible can be heated to different temperatures to maintain the molten thermoplastic material at different temperatures in different portions of the chamber. The crucible further includes a baffle arrangement to restrict formation of undesirable convection currents in the molten pool and also includes a multiplicity of orifices to provide means to withdraw the material from the chamber in the form of fine filaments.

Background of the invention

Figure 1:
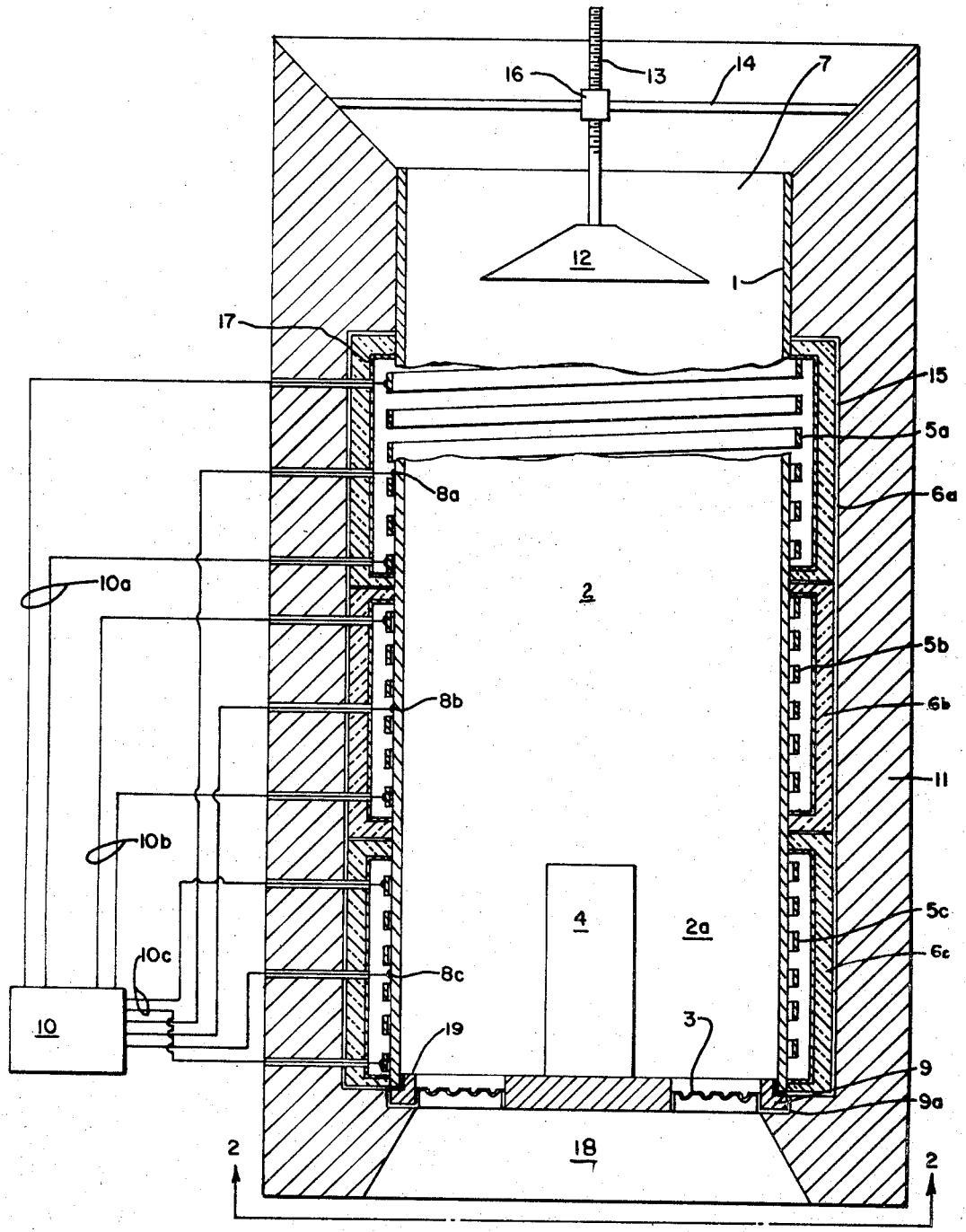

Various furnaces have been provided to melt thermoplastic substances, for example glass, so that the material can be drawn into very fine filaments. One such furnace has included a crucible defining a chamber to hold glass particles where a flame is directed into the chamber to melt the particles and form a pool of molten glass within the chamber. An orifice plate is provided in the bottom of the crucible and fine filaments are formed by drawing the molten glass through the orifices. Other furnaces have provided a crucible made of material of selected dielectric characteristics where the crucible defines a chamber to hold the thermoplastic material for melting and the crucible is heated by induction heating means. Heat is transferred by conduction from the heated crucible to melt the thermoplastic material. Such induction heating apparatus is expensive, inefficient, and complicated because of the complex control required and because it is generally necessary to provide auxiliary cooling means for the induction heaters.

Furthermore, in drawing glass to form fine filaments the condition of the glass at the orifices significantly affects the characteristics of the glass filaments so it is desirable to control very closely the temperature of the molten glass at the orifices. In previous apparatus the temperature of the molten glass has been measured by temperature sensing elements located in the pool of molten glass. The heat supplied to the casing has been controlled in accordance with the temperature measured by the temperature sensing elements but thermal gradients exist within the molten pool and cause convection currents which make it very difficult to accurately determine the temperature and effectively control the heat provided for the glass.

In some apparatus where molten glass is withdrawn from a melting furnace to form fine filaments, at least two separate crucibles are provided to define separated chambers and the glass is maintained at different temperatures in the separated chambers. The molten glass is melted in the first chamber and flows to the second chamber. The second chamber includes orifice means through which the glass is drawn to form filaments and is maintained at a selected temperature to provide the desired properties for drawing filaments. Such an arrangement is expensive to manufacture and cumbersome to operate.

Summary of the invention

The present invention provides a furnace to melt thermoplastic materials, for example glass, in a crucible where heat is transferred from a radiant heat source to selected segments of the surface of the crucible and the temperature of the selected segments of the surface are controlled at different temperatures. Furthermore, the present invention advantageously provides a straightforward apparatus including a single melting chamber in which glass is melted and the molten glass can be maintained at different temperatures in different portions of the chamber so it is not necessary to provide temperature sensitive means within the chamber to measure the temperature of the molten glass. Moreover, the present invention provides an apparatus to control the condition of molten glass to be withdrawn from a multiplicity of orifices as filaments without direct measurement of the temperature of the molten glass.

Various other features of the present invention will become obvious to those skilled in the art upon reading the disclosure set forth hereinafter.

More particularly, the present invention comprises: a crucible defining a melting chamber having a multiplicity of orifices so material melted within the chamber is emitted through the orifices to form filaments; crucible heating means including first radiant heat source disposed to direct heat to a first segment of the outer surface of the crucible and a second radiant heat source disposed to direct heat to a second segment of the outer surface of the crucible between the first segment and the orifice means; control means to regulate the first heat source to control the temperature of the surface of the first segment of the crucible within selected limits and regulate the second heat source to control the temperature of the surface of the second segment of the crucible within selected limits; and, baffle means included within the chamber and disposed adjacent the orifice means to direct the flow of molten thermoplastic material toward the walls of the crucible and restrict convection currents within the molten material.

It is to be understood that the description of the present invention given herein is not by way of limitation and that various changes can be made in the arrangement, form, or configuration of the apparatus disclosed herein without departing from the scope or spirit of the present invention.

Referring now to the figures:
FIGURE 1 is an elevational view, in section, of an apparatus in accordance with the present invention;
FIGURE 2 is a view taken along a plane passing through line 2—2 of FIGURE 1;
FIGURE 3 is an enlarged view of an orifice plate which can be used in an apparatus in accordance with the present invention;
FIGURE 4 is a view taken along a plane passing through line 4—4 of FIGURE 3;
FIGURE 5 is a perspective view of a cover plate and baffle arrangement which can be used in an apparatus in accordance with the present invention; and
FIGURE 6 is a perspective, partially broken away, view of a heater element which can be used in an apparatus in accordance with the present invention.

The apparatus of the example of the figures can be used to melt a selected thermoplastic material, for example glass, where the molten material is emitted from the apparatus as fine filaments.

The apparatus of the example includes an open end cylindrical crucible 1 which can, advantageously, be made of a thermal conductive heat resistant material for example Inconel, to contain in chamber 2 defined thereby molten glass at very high temperature and can be of uniform diameter to provide a continuous pool of molten material. One end of chamber 2 of crucible 1 is bounded by a plate 9 which includes an orifice plate 3 having a multiplicity of orifices for emission of glass from chamber 2 in the form of very fine filaments. Crucible 1 is contained within an outer casing 11.

In the example shown in FIGURE 1, crucible 1 is partially encased by heating elements 6 which are provided to heat selected portions of the surface of crucible 1. Each heating element 6 can include a cylindrical insulator 17 which can be made of heat insulating material, for example molded ceramic, and a resistance heating coil 5. In the example of FIGURE 1 three heating elements 6a, 6b, and 6c are provided to heat different segments of the surface of crucible 1.

Referring to FIGURE 6, insulator 17 of each heating element 6 can be cylindrical and can include inwardly directed peripheral flanges 17a at opposite ends to define a recess therebetween which is adapted to receive the aforementioned radiant heat emitting resistance coils 5. Flanges 17a likewise define an aperture to receive crucible 1 so that when the apparatus is assembled as shown, elements 6 surround crucible 1 in stacked relation. The area of the surface of crucible 1 to be heated by each heating element 6 is a cylindrical segment defined between flanges 17a of each heating element 6.

The inner surface of the insulator of each heating element 6 can be lined with a reflective material 15, as shown, so radiation emitted from coils 5 is reflected toward crucible 1 and the heat is not lost but is absorbed by crucible 1. Advantageously, coils 5 can be disposed within the recesses in insulator 17 of each element 6 to avoid contact with both crucible 1 and reflector surface 15 so there is no conductive heat transfer from coils 5 to crucible 1 and no electrical short circuit between coils 5 and lines 15.

An electric power supply 10 is provided to furnish power for coils 5 and includes separate power sources 10a, 10b, 10c for each of the resistance coils 5a, 5b, 5c, respectively, so the heating elements can be independently and selectively operated.

In accordance with one feature of the present invention temperature sensitive elements 8a, 8b, 8c are provided to measure the temperature of the segment of the surface of crucible 1 heated by the respective heating elements 6a, 6b, and 6c. Each temperature sensitive element, for example a thermocouple, transmits the temperature at the particular segment of the surface of crucible 1 to power supply 10 to control the flow of electric current to the individual resistance heating coil 5 and maintain the segment of the surface of crucible 1 at the desired temperature.

In the example of the figures glass melted in chamber 2 is emitted from crucible 1 through orifices 21 of orifice plates 3. Referring to FIGURE 3, orifice plates 3 are of semi-circular configuration and of corrugated cross-section with a multiplicity of orifices 21 of selected diameter provided at the crest of each of the corrugations. A cover plate 19 is provided to be received by one end of crucible 1 and includes semi-circular slits adapted to receive orifice plates 3 (FIGURES 2 and 5) which are disposed in cover plate 19 in an annular configuration. Plate 19 includes a flange 9 defining a surface 9c to contact crucible 1, as shown in FIGURE 1. In the example of the figures a baffle 4 extends upwardly from the central portion of cover plate 19 into chamber 2 to define an annular chamber 2a between baffle 4 and casing 1 adjacent orifice plates 3.

As shown in FIGURE 1, crucible 1, heating elements 6, and end plate 19 can be assembled in a cylindrical casing 11. Casing 11 can be split, as shown in FIGURE 2, to facilitate assembly and can be made of heat insulating material, for example molded ceramic. Casing 11 includes a recessed portion, as shown, to receive heating elements 6 and flared outlet 18 having a diameter greater than the diameter of annular orifice plates 3. Filaments emitted from orifices 21 are drawn through outlet 18 to be wound on a selected collector, not shown. A lip 9a is provided in casing 11 to receive flange 9 of plate 19 and crucible 1 rests on surface 9c of flange 9 as hereinbefore described.

In some apparatus in accordance with the present invention it is desirable to distribute the solid thermoplastic material toward the walls. For example, a spider support 14 can be provided to be supported by casing 11 and disposed adjacent opening 7 of crucible 1 to mount a distributor 12. Spider 14 can include a central threaded element 16 and distributor 12 can include a threaded shank 13 adapted to be received by element 16 so that distributor 12 can be raised and lowered within chamber 2 by turning shank 13.

When the furnace of FIGURE 1 is used to melt glass, large particles of glass can be introduced through opening 7 and are deflected toward the heated walls of casing 1 by distributor 12.

In the example of the figures, three cylindrical segments of the surface of crucible 1 are defined by and receive heat from, three heating elements 6a, 6b, and 6c as hereinbefore described. The heaters are individually controlled in accordance with the surface temperature of crucible 1 in the area heated by the respective heating elements so that the different cylindrical segments can be maintained at different temperatures. Heat transmitted from heaing coils 5 to crucible 1 is conducted to the glass within the chamber and the temperature of the glass approaches the temperature of the crucible.

In the example of the figures, most of the glass particles are melted in the portion of chamber 2 defined by the segment of crucible 1 heated by element 6a and that segment of crucible 1 is maintained at a higher temperature than the segments of the crucible heated by elements 6b and 6c which define portions of chamber 2 where the glass is in a molten state.

Advantageously, element 6c can maintain the surface of crucible 1 at a temperature below the temperature of the surface heated by element 6a and slightly above the desired temperature of the glass within the annular chamber 2a so the glass is heated to the desired temperature immediately before emission from crucible 1 to provide the proper characteristics in the glass to be drawn as filaments from orifices 21.

The segment of surface of crucible 1 heated by element 6b can be maintained at a temperature lower than the temperature of the segment heated by element 6c, but high enough to assure the glass remains in a molten state in chamber 2, so the molten glass is cooled to a temperature below the desired temperature for drawing filaments but high enough to assure the glass is in a molten state.

Thus, glass is melted in the portion of chamber 2 heated by element 6a. The temperature of the molten pool can then be reduced but the melting process is completed in the portion of chamber 2 heated by element 6b. Finally, the molten pool can be reheated by element 6c to provide the desired temperature for drawing filaments and it is not necessary to provide direct measurements of the temperature of the glass in chamber 2.

Because of the thermal gradients which purposely exist within chamber 2 convection currents would normally occur and would adversely affect the temperature and characteristics of the glass drawn from the chamber 2a. The currents would be particularly severe in chamber 2a where the glass is reheated. To prevent such convection currents the present invention provides baffle 4 to restrict flow of convection currents in the portion of crucible 1 heated by element 6c to assure uniform, controlled glass temperature in annular chamber 2a and the characteristics and temperature of the molten glass emitted from orifice plate 3 can be very carefully controlled without directly measuring the temperature of the glass within casing 1.

The invention claimed is:

1. A furnace to melt a thermoplastic material comprising: a crucible defining a melting chamber in which the thermoplastic material is melted, said crucible including a multiplicity of orifices so material melted within said chamber is emitted through said orifices to form filaments; radiant heat means including a first radiant heat source to direct heat to a first selected segment of the surface of said crucible and a second radiant heat source disposed to direct heat to a second selected segment of the surface of said crucible where said second segment of said surface is between said first segment and said orifice means; control means to regulate said first radiant heat source to control the temperature of said first segment of said crucible within selected limits and regulate said second radiant heat source to control the temperature of said second segment of said crucible within selected limits; and, baffle means disposed within said chamber adjacent said orifice means to restrict convection currents within said pool of molten material in the area of said chamber adjacent said orifice means.

2. The apparatus of claim 1 including a third radiant heat source means disposed to direct heat toward a third segment of the surface of said crucible between said second segment and said orifice means and control means to regulate said third radiant heat source means to control the temperature of said third segment of said crucible within selected limits.

3. The apparatus of claim 1 wherein said orifice means includes an orifice plate having a multiplicity of orifices in an annular arrangement with baffle means disposed to extend into said chamber from the central portion defined by said orifice means.

4. A furnace to melt a thermoplastic material comprising: a cylindrical crucible defining a melting chamber to melt a thermoplastic material; orifice plate means adjacent one end of said cylindrical crucible, said orifice means having a multiplicity of orifices so material melted within said chamber is emitted through said orifices to form filaments; crucible heating means including first radiant heat element disposed to direct heat toward a first cylindrical segment of the surface of said crucible, second radiant heat element disposed between said first heat source means and said orifice means to direct radiant heat toward a second cylindrical segment of the surface of said crucible between said first segment and said orifice means, and third radiant heat element to direct heat toward a third cylindrical segment of said crucible between said second segment and said orifice means; control means to control the supply of power to said first heat element including means to control the temperature of said first segment of said crucible within first selected limits, to regulate said second radiant heat element to control the temperature of the surface of said second segment of said crucible within a second selected range of temperature lower than said first temperature range and regulate said third heat element to control the temperaure of the surface of said third segment of said crucible within a selected temperature range between said first and second temperature ranges; and, baffle means extending from said orifice plate means into said chamber defined by said crucible means to direct the flow of molten thermoplastic material toward the walls of said crucible and restrict convection currents within said molten material in the portion of said chamber adjacent said orifice means.

5. The apparatus of claim 4 wherein said crucible is of uniform diameter.

6. The apparatus of claim 4 wherein said radiant heat elements comprise: cylindrical casing means to hold a radiant heat source to direct to said crucible wherein the internal diameter of said casing is greater than the diameter of said crucible so said element defines a cylindrical segment of the surface of said crucible to be heated by said heater element.

7. The apparatus of claim 4 wherein said orifice means are arranged in an annular configuration in said orifice plate and said baffle extends, from the central portion of said orifice plate defined by said orifice means, into said chamber to define an annular chamber between said baffle means and the inner surface of said crucible.

References Cited

UNITED STATES PATENTS

| 1,933,851 | 11/1933 | Granzer | 219—424 XR |
| 2,767,300 | 10/1956 | De Verter | 219—421 |
| 2,924,695 | 2/1960 | Atkeson | 219—352 XR |
| 2,963,529 | 12/1960 | Schmidt | 219—422 XR |
| 3,187,076 | 6/1965 | Machlan et al. | 13—6 |

FOREIGN PATENTS 642,858  9/1950  Great Britain.

BERNARD A. GILHEANY, *Primary Examiner.*

H. B. GILSON, *Assistant Examiner.*